ANALYTICAL BALANCE

Filed March 28, 1951 6 Sheets-Sheet 1

INVENTORS.
William C. Seyter
William Mender
Thomas Windisch
BY Fraser, Myers & Manley
ATTORNEYS Oct. 5, 1954 W. C. SEYTER ET AL 2,690,906

ANALYTICAL BALANCE

Filed March 28, 1951 6 Sheets-Sheet 2

INVENTORS.
William C. Seyter
William Mender
Thomas Windisch
BY Fraser, Myers & Manley.
ATTORNEYS Oct. 5, 1954 W. C. SEYTER ET AL 2,690,906

ANALYTICAL BALANCE

Filed March 28, 1951 6 Sheets-Sheet 3

INVENTORS.
William C. Seyter
William Mender
Thomas Windisch
BY Fraser, Myers & Manley
ATTORNEYS.

Oct. 5, 1954 W. C. SEYTER ET AL 2,690,906

ANALYTICAL BALANCE

Filed March 28, 1951 6 Sheets-Sheet 4

INVENTORS.
William C. Seyter
William Mender
Thomas Windisch

BY Fraser, Myers & Manley

ATTORNEYS.

ANALYTICAL BALANCE

Filed March 28, 1951 6 Sheets-Sheet 5

INVENTORS.
William C. Seyter
William Mender
Thomas Windisch
BY Fraser, Myers & Manley
ATTORNEYS.

Oct. 5, 1954 W. C. SEYTER ET AL 2,690,906

ANALYTICAL BALANCE

Filed March 28, 1951 6 Sheets-Sheet 6

INVENTORS.
William C. Seyter
William Mender
Thomas Windisch
BY Fraser, Myers & Manley
ATTORNEYS.

Patented Oct. 5, 1954

2,690,906

UNITED STATES PATENT OFFICE 2,690,906

ANALYTICAL BALANCE

William C. Seyter, Union City, William Mender, Midland Park, and Thomas Windisch, Montclair, N. J., assignors to The Torsion Balance Company, Clifton, N. J., a corporation of New York Application March 28, 1951, Serial No. 217,961

18 Claims. (Cl. 265—60)

The present invention relates to weighing scales or balances and aims to provide certain improvements therein. More particularly it relates to the type of balance in which a fine weighing chain is hung at one end from the balance beam and at the other end from a movable carrier, whereby more or less of the chain may be adjusted to bear upon the beam, as may be required for the weighing operation.

The object of the invention is to generally improve the constructional features of a balance of the type described so that weighing operations can be more accurately and quickly performed.

The invention comprises the advantages, combinations and arrangements of parts set forth in the following detailed description and illustrated in the accompanying drawings, from which the several features of the invention, together with the advantages obtainable thereby, will be readily understood by persons skilled in the art.

In the drawings, wherein like reference characters denote corresponding parts throughout the several views.

Figures 8, 9, 10, 11, 11A:
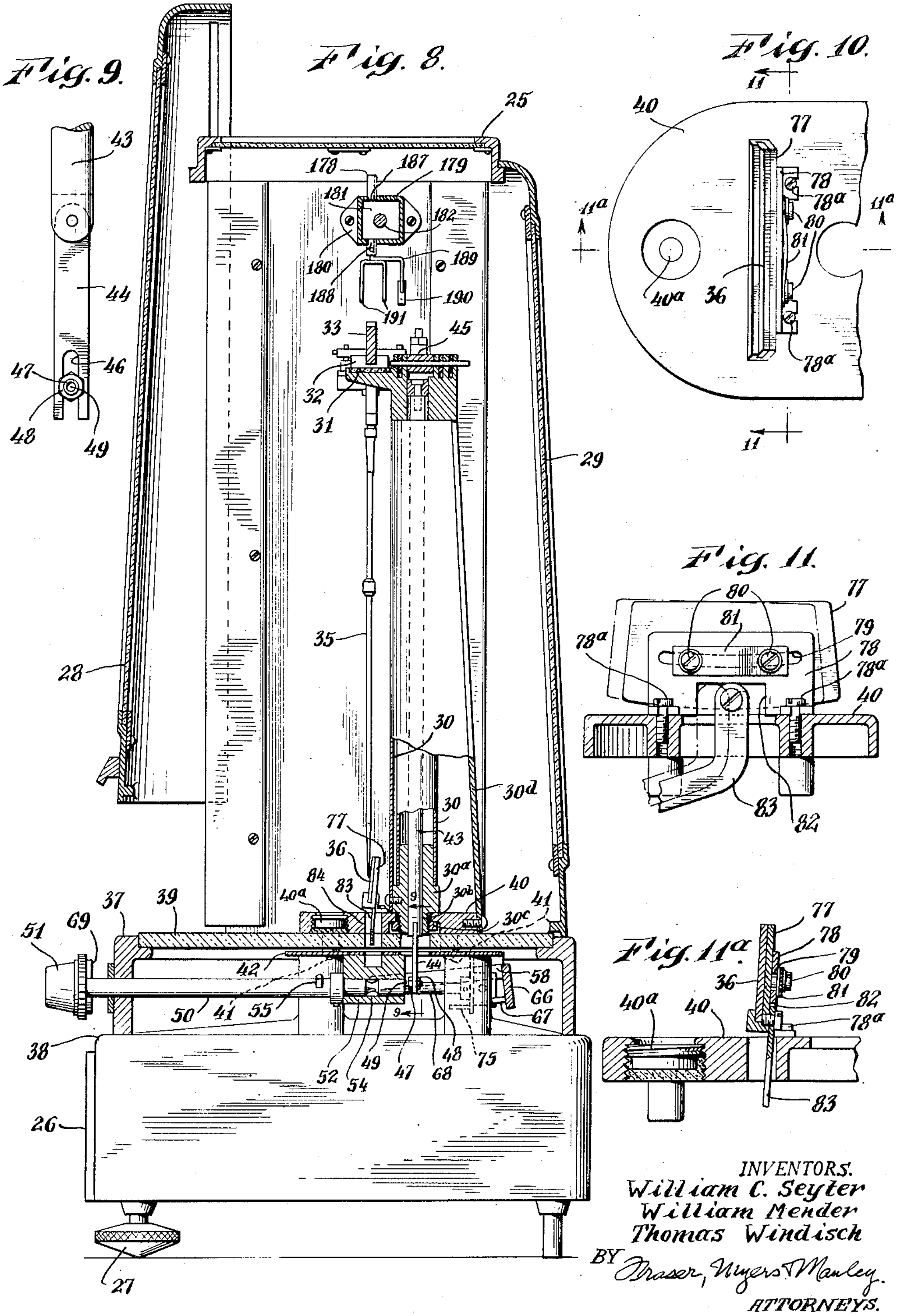
Fig. 8 is a vertical sectional view taken along the line 8—8 of Fig. 1, the front panel of the balance case being shown in partially open position.
Fig. 9 is a vertical sectional view taken along the line 9—9 of Fig. 8.
Fig. 10 is a top plan view of the index plate assembly.
Fig. 11 is a vertical sectional view taken along the line 11—11 of Fig. 10.

Fig. 11*a* is a horizontal sectional view taken along the line 11*a*—11*a* of Fig. 10.

Figures 12, 13, 14, 15, 16:
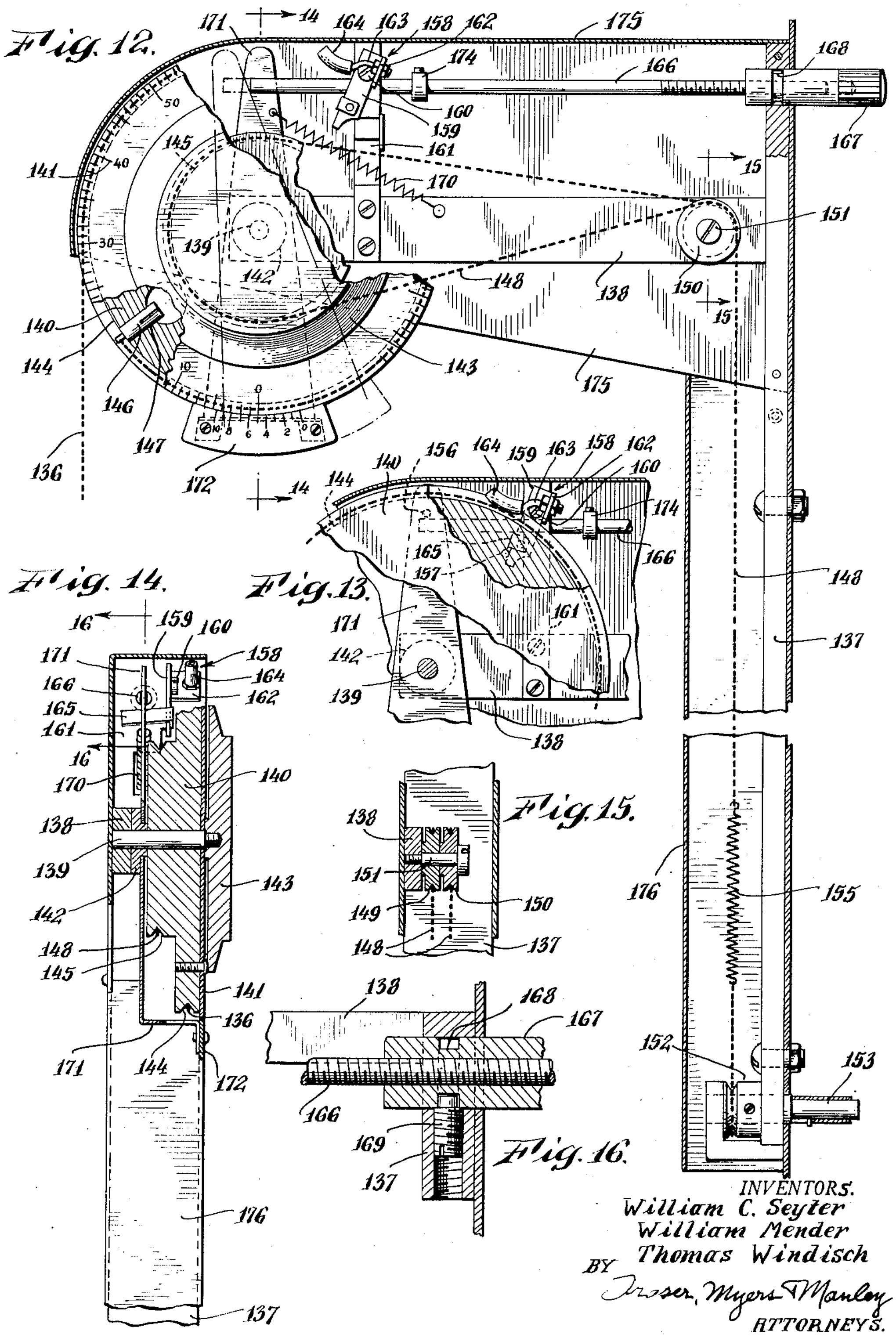

Fig. 12 is an enlarged front elevational view of the chain dial assembly, with parts thereof broken away.

Fig. 13 is a fractional detailed view of a part of Fig. 12.

Fig. 14 is a vertical sectional view taken along the line 14—14 of Fig. 12.

Fig. 15 is a vertical sectional view taken along the line 15—15 of Fig. 12.

Fig. 16 is a vertical sectional view taken along the line 16—16 of Fig. 14.

Figure 17:
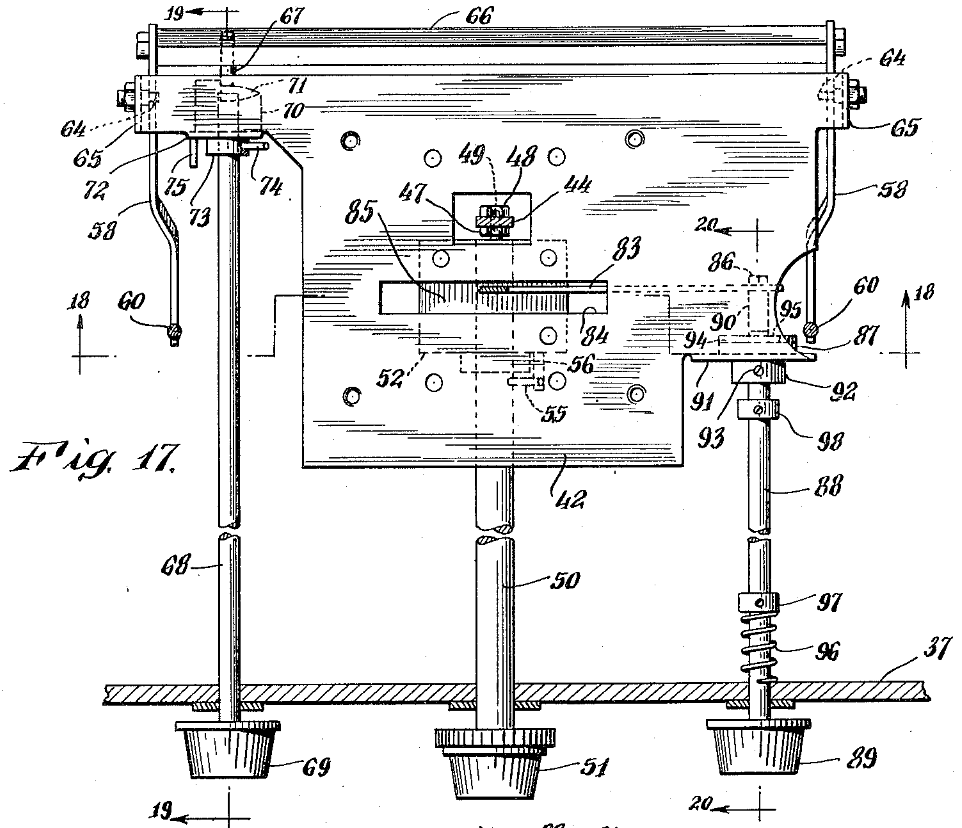

Fig. 17 is a top plan view of the bracket assembly for the beam arrest, the pan arrest and the index plate.

Figure 18:
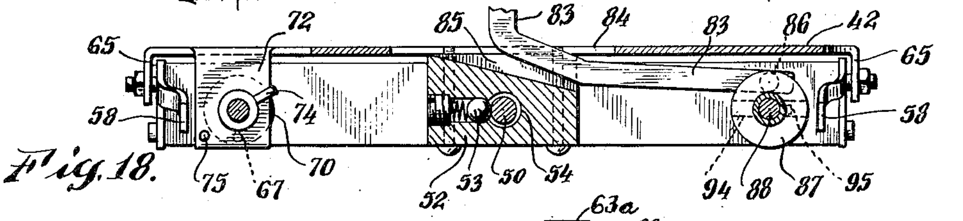

Fig. 18 is a vertical sectional view taken along the line 18—18 of Fig. 17.

Figure 19:
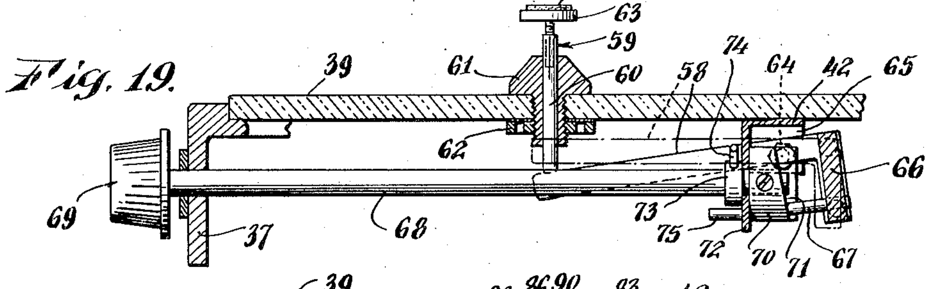

Fig. 19 is a vertical sectional view taken along the line 19—19 of Fig. 17.

Figure 20:
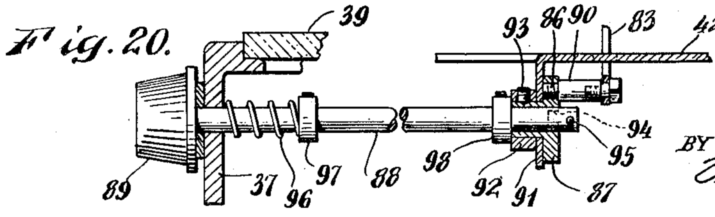

Fig. 20 is a vertical sectional view taken along the line 20—20 of Fig. 17.

Figures 21, 22, 23:
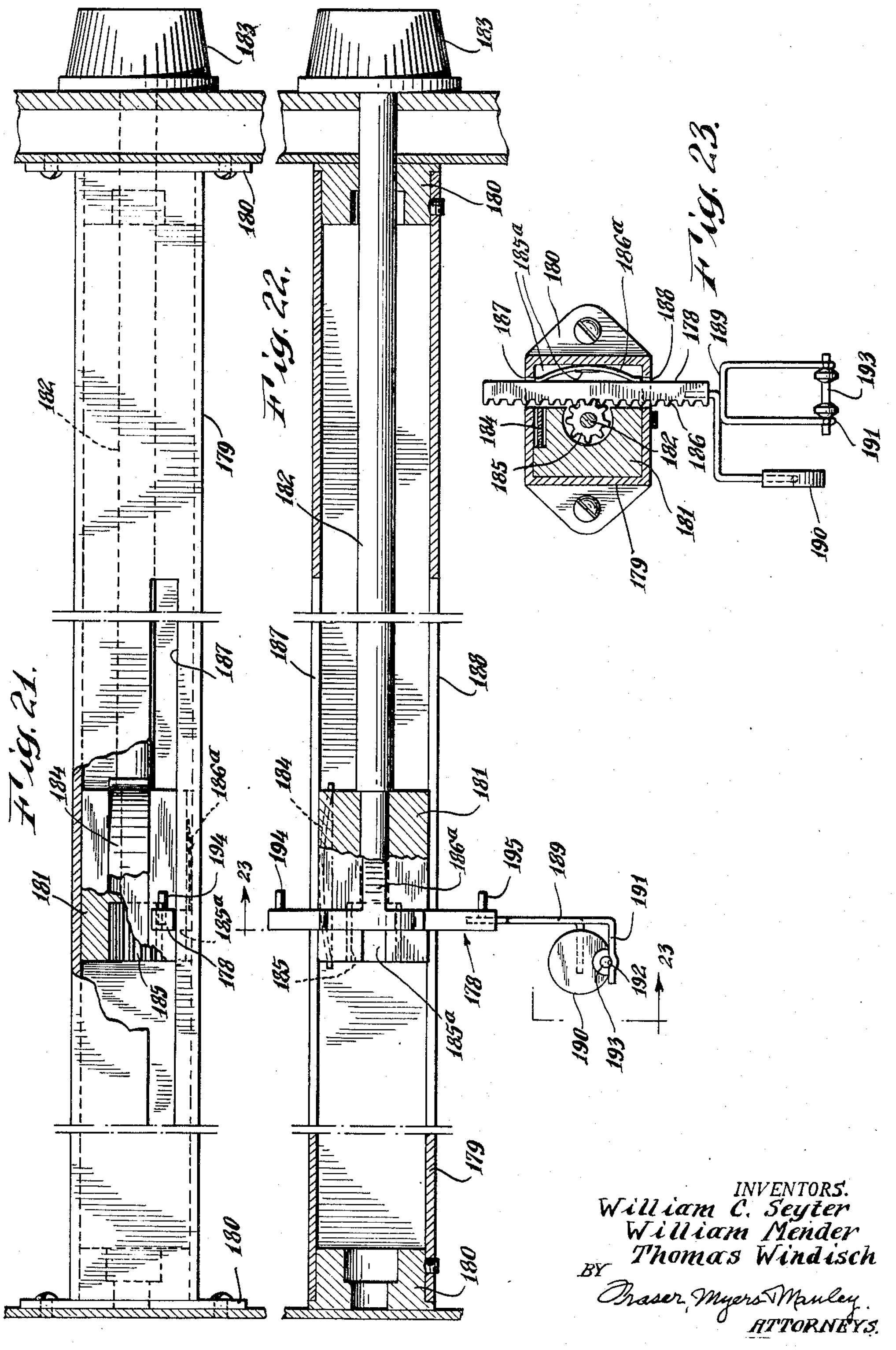

Fig. 21 is a top plan view of the rider lifter assembly, with parts thereof broken away.

Fig. 22 is a side elevational view of the rider lifter assembly, with parts thereof broken away.

Fig. 23 is a vertical sectional view taken along the line 23—23 of Fig. 22.

Figures 1, 2, 3, 4:
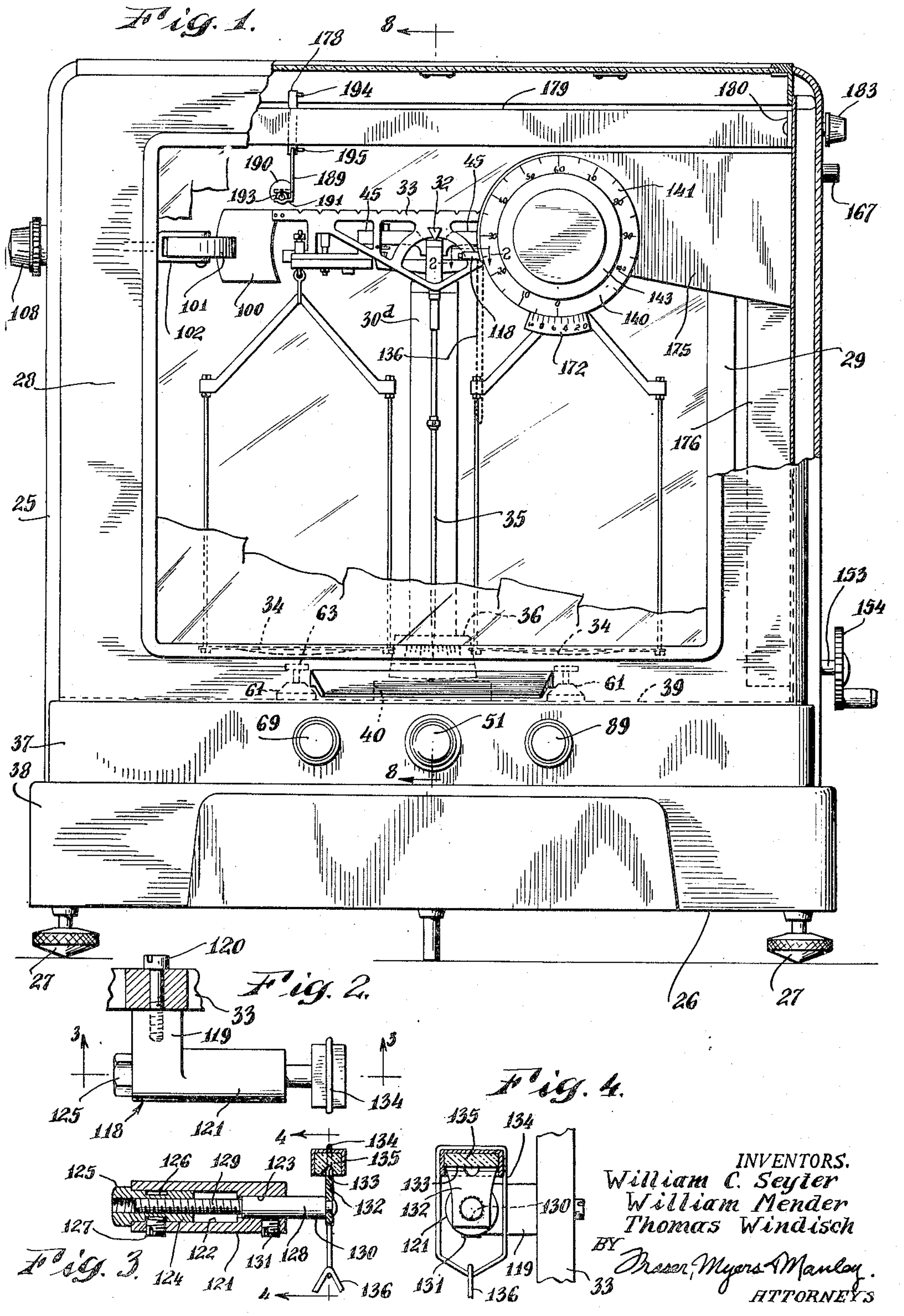
Figure 1 is a front elevational view of a balance embodying our invention, parts being broken away to better illustrate certain constructional details.
Fig. 2 is a horizontal sectional view taken along the line 2—2 of Fig. 1 and showing the chain carrier bracket assembly.
Fig. 3 is a vertical sectional view taken along the line 3—3 of Fig. 2.
Fig. 4 is a vertical sectional view taken along the line 4—4 of Fig. 3.
Figure 5:
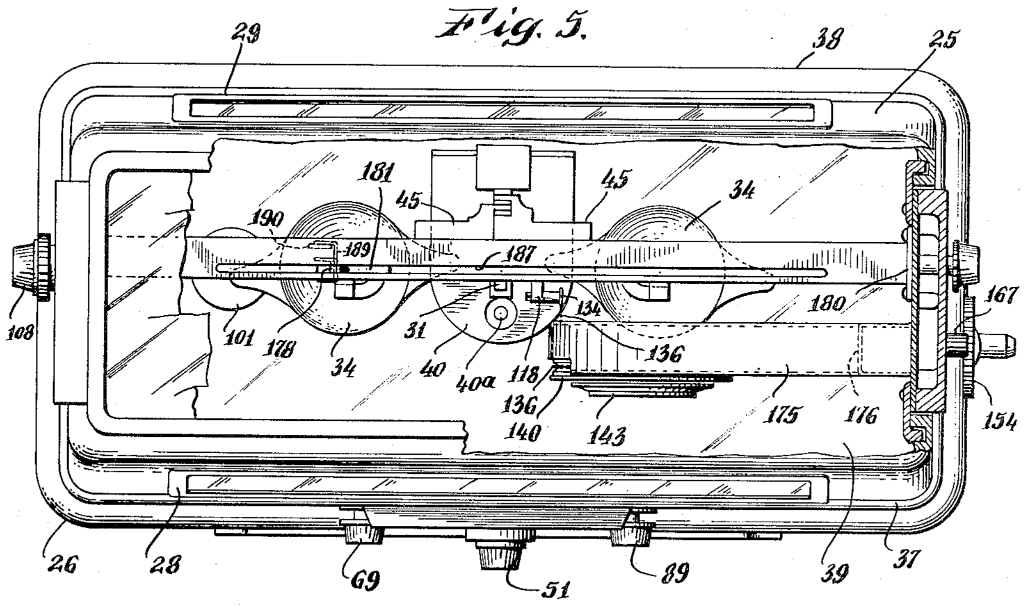
Fig. 5 is a top plan view with parts thereof broken away to better illustrate certain details.
Figure 6:
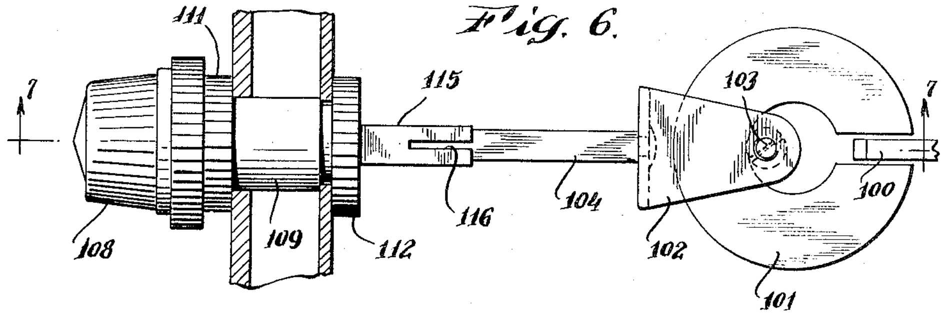
Fig. 6 is a top plan view of the magnetic damping assembly.
Figure 7:
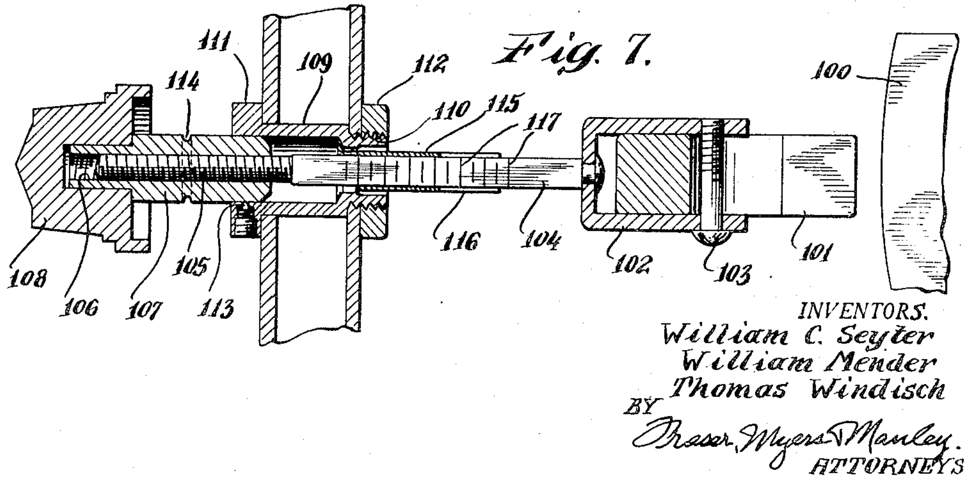
Fig. 7 is a horizontal sectional view taken along the line 7—7 of Fig. 6, the magnet being shown as withdrawn out of damping position.

Referring first to Figs. 1, 5 and 8 of the drawings, the reference character 25 denotes a balance case having a base 26, leveling screws 27 and sliding front and rear panels 28 and 29, respectively. Within the case 25 is a column 30 having at its top an agate bearing 31 upon which a central knife edge 32 carried by a balance beam 33 is adapted to be supported. The balance beam 33 has suspended from its ends, scale pans 34, and from its midpoint dependingly carries a needle or pointer 35 which is adapted to swing in front of a graduated index 36.

The balance case 25 is herein shown as formed of metal and glass, the base 26 being constituted by an upper base member 37 and a lower base member 38, the upper base member supporting a glass base panel 39. The balance case and the operational parts thereof are not herein described in detail as they constitute the subject matter of our co-pending application, Serial No. 217,962, filed March 28, 1951.

The column 30 is mounted upon a base plate 40 which is held onto the top of the base panel 39 by screws 41 which extend through plate 42 mounted on the upper base member which will be presently described more in detail. A bubble level 40*a* is mounted in the plate 40. The column 30 is held on the base plate by a hollow bushing 30*a* having a screw-threaded nipple 30*b* extending through an opening in the base plate and locked thereagainst by a nut 30c. The column is enclosed within a housing 30d.

*Lift rod for operating beam arrests*

In prior balance constructions, the weight of the lift rod for the beam arrests was relied upon to cause the rod to fall or descend when de-arresting the balance. Because of the close tolerances in connection with the eccentric pin of the roller shaft for operating the lift rod, the lift rod tongue and the arrest arms of the beam, the tongue always presented a problem. The ideal, of course, is to have the tongue pull the lift rod down. Because of the difference from balance to balance, it was found necessary to have an open slot in the tongue. Adjusting personnel carefully adjusted the upper surface of the slot to obtain the correct arrestment. The de-arrestment, however, depended upon the rod falling by itself, of its own weight.

According to the present invention the lift rod is positively operated in both arresting and de-arresting the balance. Within the column 30, which is hollow, is a lift rod 43 which is guided for vertical movement and to the lower end of said lift rod there is pivotally connected a link or tongue 44 and to the upper end of said lift rod are pivotally connected the balance beam arrests 45. The lower end of the tongue 44 is slotted, as shown at 46 (Fig. 9), and mounted in said slot for longitudinal adjustment therein is a hollow, screw-threaded stud 47 and lock nut 48 (Figs. 8, 17). Extending through the hollow, screw-threaded stud 47 is a pin 49 eccentrically mounted in the end of a roller shaft 50, the opposite end of said shaft extending through the front wall of the upper base member and being provided with a control knob 51. The roller shaft 50 is supported in a bearing within a block 52 carried on the underside of the plate 42, the shaft 50 being held against axial movement in said block by a spring-pressed ball 53 engaging in an annular groove 54 in said shaft. For limiting the angular rotary movement of the roller shaft 50 it is provided with a radially extending pin 55 which is adapted to contact a pin 56 extending outwardly from the block 52 parallel to the axis of shaft 50. The relationship of the axially extending, eccentrically disposed pin 49 and the radial pin 55 on the roller shaft 50 is such that, when the shaft 50 is rotated in a clockwise direction, the lift rod 43 will be raised to operate the beam arrests 45 to release the balance beam, and when rotated in a counterclockwise direction to de-arrest the beam and pull down the lift rod. By adjusting the position of the hollow, screw-threaded stud 47 within the slot 46 of the link 44 to provide for the correct lift of the lift rod, a continual contact is provided between the arrest eccentric pin and the lift rod is thereby positively controlled in both its upward and downward movement, and reliance upon the dropping of the lift rod upon de-arrestment of the balance beam is eliminated.

*Pan arrests*

The pan arrests in prior balance constructions had an arcing motion which introduced a "kick" or swinging motion to the balance pans when the pan arrests were actuated. In addition, the location of the pan arrest mechanism on the top surface of the base plate made cleaning the case extremely difficult.

According to the present invention as will be readily understood by referring to Figs. 1, 17 and 19, a pair of pan arrest levers 58 which are mounted to move in an arc, actuate two adjustable plungers 59 which have a vertical movement. The plungers 59 each consists of a sleeve 60 slidable within a bearing 61 mounted in the base panel 39 and held thereon by a nut 62, the sleeve having adjustably threaded into its upper end a flat-headed stud 63 having a felt or similar pad 63a for contacting the underside of a scale pan 34. The pan arrest levers 58 are pivotally mounted at 64 in proximity to their rear ends to depending ears 65 formed on the plate 42, the rear ends of the pan arrests being rigidly connected to a weight bar 66 which acts to hold the forward end of the pan arrest levers in elevated position, e. g., in a position to hold the plungers 59 in "up" or scale pan arresting position. The weight bar 66 has an adjustable pin 67 which contacts the pan arrest control rod 68 which is operable from in front of the balance case by a knurled knob 69. At its rear end the control rod fixedly carries a cam 70 having an end cam surface 71 against which bears the inner end of the pin 67, the rod extending through a bearing opening in an ear 72 depending from the plate 42. To hold the cam against the ear 72 a collar 73 is fixedly mounted on the control rod by a set-screw pin 74. By means of the adjustable pin 67 it is possible to properly position the pan arrest levers in relation to the plungers 59. For limiting the rotation of the cam 70, the pin 74 is adapted to engage a stop pin 75 extending at a right angle to the ear 72.

Thus with the cam 70, the adjustable pin 67 and the adjustable plungers 59 a smooth even pan arrestment is obtained free from the "kick" which invariably accompanies scale pan de-arrestment in conventional balances.

*Adjustable pointer index*

In prior adjustable pointer indexes, the control knob had a direct linkage which caused the rotation of the knob to be translated to the index plate itself. If the knob was accidentally bumped, the index would be moved out of its adjusted position. The prior indexes had the index plate attached to a pendulum which pivoted about a point at the top of the column. The entire arrangement necessitated a complicated assembly and costly adjustment.

According to the present invention, the pendulum construction has been eliminated. Referring now to Figs. 10, 11, 11a, 17, 18 and 20 of the drawings, the index 36 comprises a plate 77 which is mounted on a metal holder 78 which, in turn, is secured by screws 78a to the base plate 40 which supports the column 30. The holder 78 has an arcuate slot 79, the radius of which coincides with the arc of the pointer 35, and guided in said slot is a pair of screws 80 carried by the plate 77 and secured to a connecting spring strip 81. The holder 78 is also formed with a recess 82 the function for which will be presently understood. Hence adjustment of the index plate will cause it to move in the same arc as the pointer. Actuation of the index is accomplished from below through an eccentric clutch arrangement now to be described. Secured to the plate 77 is one end of an angular connecting rod 83 which is movable in the recess 82, the intermediate portion of the rod extending through a slot 84 in plate 42 and a recess 85 in block 52, the other end of the connecting rod being pivotally connected to the shank of a headed screw 86 eccentrically mounted and rigidly carried by a sleeved disc 87 loosely mounted adjacent one end of a shaft 88, the other end of which extends through the front of the casing and carries a knurled knob 89. As shown, the connecting rod is mounted in spaced relation to the disc 87 by a sleeve 90. The sleeved disc 87 is held against a depending ear 91 on the plate 42 by a collar 92 fixed on the shaft by a set screw. The disc 87 is formed with a diametrical slot 94 into which a cross-pin 95 on the shaft is adapted to be positioned when the shaft is pulled outwardly to provide a clutch and when the clutch is engaged, the disc 87 can be rotated by rotating the knob 89. Normally the cross-pin 95 is held out of engagement with the slot 94 by a coil-spring 96 bearing at one end against the inner face of the upper base member 37 and at its other end against a collar 97 fixed on the shaft 88. To limit the inward movement of the shaft by the spring 96, a collar 98 is fixed on the shaft in predetermined fixed relation to the sleeve 92. To set the zero on the index 36 which is fixedly secured to the plate 77, the knob 89 is pulled outwardly to engage the clutch and by rotating the knob the pointer can be quickly set at the zero point. When the operator releases the knob, the spring 96 disengages the clutch. Hence, it is impossible to move the setting of the index without intentionally doing so.

*Magnet damping assembly*

In prior balances employing a magnetic damping means, the magnet was generally mounted in fixed relation to the balance beam, hence, if damping was not desired for any particular weighing, nothing could be done about it.

According to the present invention the magnet is mounted to be quickly retractable or it may be adjusted to provide for any desired degree of damping action. By referring to Figs. 1, 3, 6 and 7 of the drawings it will be seen that we have provided a magnetic damping assembly which is fully retractable and adjustable. In said figures we have shown the balance beam 33 as provided at its left end with a thin magnetic permeable plate or vane 100 disposed and extending beyond the beam in the longitudinal central plane thereof, and adapted for cooperative action with said vane there is provided a horseshoe permanent magnet 101. The magnet is secured within a U-shaped bracket 102 by a screw 103 and the bracket is mounted on a square shank 104 of a screw-threaded stud 105 which engages internal threads 106 in a bushing extension 107 carried by a knurled knob 108. The magnet damping assembly is movably supported in a side wall of the balance case by a flanged bushing 109, the free end of which is externally screw-threaded as shown at 110, the flange 111 on the bushing being held against the outer face of the side wall of the balance case by a knurled clamping nut 112 engaging over the threaded end 110 and bearing against the inner face of the side wall of the balance case. Mounted in the flange 111 is a spring-pressed detent 113 which bears upon the bushing extension 107 which is mounted for sliding engagement within the flanged bushing 109. The bushing extension 107 is formed with an annular groove 114 within which the spring-pressed detent 113 is adapted to engage when the knob 108 is pushed inwardly to the limit of its movement. Fixedly mounted in the flanged bushing 109 is a square sleeve 115, the free ends of which are split as indicated at 116 to provide resilient fingers engaging the square shank 104. The shank 104 is provided with markings 117 to indicate the position of the magnet with respect to the vane 100. With the present magnetic damping assembly it will be apparent that the magnet may be quickly retracted free of the vane on the beam if the operator so desires, or adjusted to any desired degree of damping which can be readily duplicated because of the markings 117.

*Chain carrier*

In prior balances of the type employing a suspended fine weighing chain, the final adjustments of the chain carrier knife were extremely difficult. The chain carrier knife edge must be on the same plane as the knife edges of the balance beam. With prior balance constructions this was difficult to obtain. One of the final adjustments to be made in a balance is the fine adjustment of the chain to be certain, for the weight of chain involved, that the carrier knife is at the proper distance from the central knife edge of the beam. This is an extremely delicate adjustment which, in prior balance constructions, usually resulted in a twisting of the carrier knife out of the proper plane.

According to the present invention the chain carrier is of a construction which insures the exact location of the plane of the chain carrier knife edge. The carrier is so constructed that adjustments are accomplished by the mere turning of a screw, in the course of which the plane of the chain carrier knife edge remains unchanged and a fine degree of adjustment can be easily obtained. The construction of the chain carrier will be readily understood by referring to Figs. 1 to 4 of the drawings wherein a right-angled carrier bracket 118 has its short arm 119 secured to a plane face of the balance beam 33 by a securing screw 120. The long arm 121 of the carrier bracket has a bore therethrough of different diameters 122 and 123. Extending into the end of the bracket adjacent the short arm is a hollow screw-threaded bushing 124 having a hexagonal head 125 for facilitating rotation of the bushing. In spaced relation to the head 125, the bushing is formed with an annular recess 126 into which extends the end of a set-screw 127 whereby the threaded bushing may be rotated within the bracket without any accompanying axial movement. Extending through the bore 123 of the bracket arm 121 is the shank 128 of a screw 129, the threads of which engage the threads within the bushing 124. The shank 128 is held against rotation by being formed with a flat side 130 against which lightly bears a second set-screw 131. It will thus be seen that as the hexagonal head 125 of the bushing 124 is rotated, the shank 128 will be axially moved into or out of the bracket arm 121. Secured to the outer end of the shank 128 is a chain carrier 132 having a knife edge 133 which is disposed in a common plane with the plane of the knife edges of the balance beam. Hence, to make the proper adjustment of the knife edge 133 from the central knife edge of the beam it is merely necessary to rotate the hex head 125 in a proper direction. The knife edge 133 is adapted to support a stirrup 134 having an angular bearing 135 adapted to seat on the knife edge 133. The stirrup carries one end of a weighing chain 136, the other end of which is hung from a movable carrier or rotatable drum presently to be described.

*Chain dial and vernier assembly*

In United States Patent No. 2,004,745 there is disclosed a chain dial and vernier assembly which has been in use for many years. With the construction shown in said patent, difficulty has been encountered in connection with the tendency of the weighing chain to "loop" or sag somewhat from the V-groove at 6 o'clock position on the dial, e. g., if the chain dial was wound up and if it hit the stop pin a trifle too hard a loop was formed at 6 o'clock position which resulted in insufficient weighing chain being supported on the beam. Also, the location of the dial control knob adjacent the rider control knob gave rise to a constant source of error due to the dial control knob being accidentally disturbed when actuating the rider rod. Furthermore, with the construction shown in said patent the vernier control knob extended outwardly from the top of the balance case and, aside from its difficultly accessible position, the magnitude of the extension depended upon the degree of adjustment which had accumulated upon repeated adjustments of the vernier.

According to our present invention the drawbacks recited in the preceding paragraph are eliminated. By referring to Figs. 1, 5, and 12 to 16 of the drawings and the following detailed description, the construction and operation of our improved chain dial and vernier assembly will be readily understood.

Secured to the inner face of the side wall of the balance case is a standard 137 having a rigid arm 138 extending at a right angle thereto, said arm adjacent its free end carrying a fixed shaft 139 upon which is rotatably mounted a drum or pulley sheave 140, upon the front face of which is carried a graduated dial 141 which may be calibrated in milligrams or any other suitable units. The drum 140 is rotatably held on the shaft 139 between a rotatable bushing 142 and an ornamental cover disc 143 which is screw-threaded onto the end of the shaft 139. The drum is formed with two annular V-shaped grooves 144 and 145, the groove 144 for accommodating the weighing chain 136, an end of which carries a split spring pin 146 which is held within a radial slot 147 in the drum, and the groove 145 for accommodating a driving belt, herein shown as a chain 148. The driving chain is trained over a pair of pulleys 149, 150, mounted for free rotation on a stub shaft 151 fixedly threaded into the arm 138 and over a pulley 152 fixed on a shaft 153 mounted for free rotation near the base of the standard 137, one end of the shaft protruding through the side of the balance case and having fixedly mounted thereon an operating wheel 154. To insure proper torque for the driving chain 148 its ends are joined by a tension spring 155. For limiting rotation of the drum in both clockwise and counterclockwise directions during taking up or paying out chain, respectively, the drum is provided on its rear surface with a pair of spaced pins 156, 157 adapted to engage stop abutments at the desired limits of rotation. As stated above, if the chain drum is rotated to take-up chain and if it hit the stop abutment a trifle too hard, a loop was formed in the chain at 6 o'clock position of the dial which resulted in insufficient weighing chain being supported on beam. To prevent such looping of the chain we have provided a novel braking device 158, herein shown as consisting of an arm 159 pivotally mounted on a screw 160 secured in an upright 161 rigidly carried by the arm 138, the arm 159 having a flange 162 which carries an ogee pin 163 having a rubber sleeve 164 enclosing one end of the pin. The arm 159 is biased by a leaf-spring 165 to normally hold the rubber covered end of the pin out of engagement with the weighing chain, as shown in Fig. 12. The free end of the spring 165 bears upon the upright 161. A carrier rod 166 has a bearing in the upright 161 and at its outer end screw-threadedly engages in a control knob 167 which has a bearing in the standard 137 and extends through the side wall of the casing. Accordingly, in rotating the drum 140 in a clockwise direction, the pin 157 will strike the pivoted spring-biased arm 159 just prior to reaching the limiting point in rotation, whereupon said arm is rotated about its pivot against the tension of the spring to force the rubber covered end of the pin into braking engagement with the weighing chain 136 and thus prevent looping of the chain, as shown in Fig. 13. At the limit of rotation of the drum in a counterclockwise direction the pin 156 will be brought into engagement with the upright 161 to prevent further rotation of the drum. The control knob 167 is formed with an annular groove 168 into which extends the end of a set-screw 169 threaded into the standard 137 so that the control knob will have rotary but non-axial movement. However, rotation of the control knob will impart axial movement to the carrier rod 166 because of the screw-threaded connection thereof with the non-axially movable but rotatable control knob. The carrier rod is bifurcated at its end opposite to that which engages within the control knob and held in engagement with the base of the slot provided by the bifurcation, by a tension spring 170, is the apex end of a substantially triangular shaped vernier carrier 171, the base of which is angularly bent and carries a verneir 172 in a common plane with the graduated dial 141. The vernier carrier at approximately its central point is mounted on the bushing 142 for rotation about the shaft 139 fixed to the arm 138. For limiting the movement of the carrier rod toward the left so that it will not become disengaged from the control knob 167 there is mounted on said carrier rod a stop sleeve 174 adapted to engage the upright 161. For the purpose of enclosing the operative mechanism for the chain dial and vernier assembly and enhancing its appearance, said parts are enclosed within housings 175, 176 suitably secured to the balance case.

From the foregoing detailed description of the chain dial and vernier assembly it will be apparent that as the operating wheel 154 is turned, the weighing chain 136 will either be wound upon or payed off the drum 140 to vary the length of the active component of the chain suspended from the balance beam. During this action the vernier 172 will remain stationary and it may then be used to read the dial 141 or may be independently adjusted to set the zero for the basis of a weighing operation.

*Rider lifter and rider rod assembly*

The present invention also contemplates an improvement in the rider lifter and rider rod assembly whereby to facilitate the use and efficiency of said parts. Referring to Figs. 1, 5, 8, 21, 22 and 23 of the drawings, a rider lifter 178 is slidingly mounted within a square tubular housing 179 supported at its ends by flanged bearings 180, 180 which are secured to the inner faces of the side walls of the balance case. The rider lifter 178 comprises a slide-block 181 mounted on a rider rod 182 which protrudes through one of the bearings 180 and through the side wall of the balance case, the outer end of the rider rod having secured thereto an operating knob 183. The slide-block 181 is formed with a longitudinal recess in its top face, within which recess is disposed a bowed spring 184 which bears against the top inner surface of the housing to resiliently hold the slide-block in any adjusted position to which it has been moved. The slide-block is also formed with a circular recess at one end within which is housed a pinion 185 carried at the inner end of the slide rod and with a cross-shaped recess 185a in one of its sides within the vertical arm of which recess is movable a rack 86 which is in mesh with the pinion. To hold the rack in any position to which it has been moved, a bowed T-shaped spring 189a is mounted in said recess 185a to bear against both the rack and the confronting inner surface of the square housing. In alignment with the rack and for accommodating movement thereof in any position of the rider rod, the housing 179 has formed in its top and bottom walls, registering parallel slots 187, 188. Carried by the rack 186 is a U-shaped rider stirrup 189 and an indexing disc 190, the stirrup having parallel, angular bent arms 191, 191 formed with aligned depressions 192 for facilitating the carrying of a dumbbell-shaped rider 193. For limiting movement of the rack both upwardly and downwardly, the rack carries a pair of screws 194, 195, the screw 195 also serving as a set-screw to hold the stem of the rider stirrup onto the rack. With a construction of rider lifter and rider rod assembly as disclosed and described, a smooth, vertical movement is obtained in raising and lowering the rider as the knob 183 is rotated, such action is facilitated by the indexing disc rearwardly of the stirrup and the construction is so sturdy as to eliminate accidental movements of the parts. Moreover, because of the constructional features, the assembly has a pleasing appearance.

While we have shown and described a preferred embodiment of our invention, it is to be understood that we do not wish to be limited to the constructional details disclosed, since these may be modified within the range of mechanical and engineering skill without departing from the spirit of our invention as defined in the appended claims.

What we claim is:

1. A weighing scale or balance comprising a column, a beam adapted to be supported on the column, beam arrests, a lift rod for arresting and de-arresting the beam and mechanical means for positively operating the lift rod in both arresting and de-arresting the beam, comprising a tongue pivotally connected to the lift rod, adjustable means for varying the effective combined length of the lift rod and the tongue and a rotatable eccentric mechanically coupled to the tongue.

2. A weighing scale or balance according to claim 1, wherein the adjustable means for varying the combined length of the liftrod and the tongue comprises a slot in the tongue, a hollow stud extending transversely through said slot and adapted to be held in any adjustable position longitudinally of said slot and an eccentrically disposed pin on the rotatable eccentric engageable in the hollow stud.

3. A weighing scale or balance having a balance beam adapted to be supported on a central knife edge, a scale pan adapted to be suspended from the beam, a pan arrest comprising a vertically movable plunger and operative means normally holding the plunger in engagement with the underside of the scale pan, comprising a pivoted lever, means normally acting on the lever to hold the plunger in its "up" position and means operable to permit the plunger to move downwardly by its own weight.

4. A weighing scale or balance according to claim 3, wherein the pivoted lever is a lever of the first class, one end of which is weighted to hold the other end in contact with the plunger to hold the plunger in its "up" position and cam controlled means operable to permit the plunger to move downwardly by its own weight.

5. A weighing scale or balance according to claim 4, wherein the cam of the cam controlled means is adjustable.

6. A weighing scale or balance having a balance beam adapted to be supported on a central knife edge, a pair of scale pans adapted to be suspended from the opposite ends of the beam, and arresting means for the pans comprising a vertically movable plunger for each scale pan, a pivoted lever in engagement with each plunger, means rigidly connecting said levers so they will move in unison, means for normally acting on the levers for holding the plungers in their "up" position in engagement with the undersides of the scale pans, said plungers being adapted to move downwardly by their own weight when the means for holding them in their "up" position are withdrawn and a single operable means for controlling the levers.

7. A weighing scale or balance having a beam adapted to be supported on a central knife edge, a pointer carried by the beam and a laterally adjustable index plate movable in an arc coincident with the arc in which the pointer is movable for cooperation with the pointer, operating means comprising a clutch for moving the index and means normally holding the clutch disengaged.

8. A weighing scale or balance according to claim 7, wherein the index plate is mounted above the base plate of the balance and the clutch controlled operating means is operable from in front of the balance below said base plate.

9. A weighing scale or balance according to claim 7, wherein the operating means for moving the index plate comprises a lever pivoted at one point to the index and at a remote point being eccentrically mounted on a rotatable member.

10. A weighing scale or balance according to claim 9, wherein the index plate is mounted above the base plate of the balance, the clutch controlled operating means includes a shaft disposed below the base plate and operable from in front of the balance below said base plate, the rotatable member to which the lever is eccentrically mounted constitutes one of the clutch members, the other clutch member being mounted on the shaft and spring means normally holding the clutch members disengaged.

11. A weighing scale or balance comprising a balance beam having a central knife edge, a chain carrier fixedly secured to the beam, a rotatable drum chain carrier, a weighing chain suspended at one end from the fixedly secured chain carrier and at its other end from the rotatable drum carrier, said fixedly secured chain carrier having a knife edge which is parallel to and in a common plane with the central knife edge of the beam, and means for adjusting the knife edge on the fixedly secured chain carrier toward and away from the central knife edge of the beam without disturbing the parallel relationship or common plane of the knife edges, the fixedly secured carrier comprising a bracket fixed to the balance beam and having an arm parallel to the plane of the balance beam, a non-rotatable but axially movable screw extending axially through the arm of the bracket, a rotatable but non-axially movable nut carried by the bracket engaging the screw and the knife edge element of said carrier being fixedly mounted on the screw.

12. A weighing scale or balance comprising a balance case having a base plate, a balance beam, a weighing chain suspended at one end from the beam, a rotatable drum to which the other end of the chain is connected for varying the effective weighing component of the chain, a driving belt for said rotatable drum, a pulley within the balance case in proximity to the base plate of the balance over which pulley said driving belt is trained and an operating wheel exteriorly of the case for rotating said pulley to rotate said drum.

13. A weighing scale or balance according to claim 12, wherein the operating wheel for the driving pulley is located at the side of the balance case substantially lower than the axis of the drum.

14. A weighing scale or balance comprising a balance case, a balance beam, a weighing chain suspended at one end from the beam, a rotatable drum to which the other end of the chain is connected for varying the effective weighing component of the chain, a driving belt for said rotatable drum and a trip brake means for engaging the weighing chain as it approaches the limit of its wound-up relation to the drum.

15. A weighing scale or balance according to claim 14, wherein the brake means is normally spring-biased out of braking position and cooperating means on the drum and on the brake means for operating the brake when said cooperating means are brought into engagement.

16. A weighing scale or balance comprising a balance case, a balance beam, a weighing chain suspended at one end from the beam, a rotatable drum to which the other end of the chain is connected for varying the effective weighing component of the chain, a graduated dial rotatable with said drum, an adjustable arcuate vernier for cooperation with the periphery of the dial, means operable from the exterior of the balance case for moving the dial and the vernier independently of each other, and spring means for holding the vernier in any set position, the means at the exterior of the case for moving the vernier comprising a threaded sleeve mounted for rotative but non-axial movement in a wall of the balance case and a member having axial but non-rotative movement screw-threadedly engaging the sleeve.

17. A weighing scale or balance comprising a balance beam adapted to support a rider along the top of the beam, a rider rod movable parallel to the beam, a lifter carried by the rider rod for applying and removing a rider from the beam, said lifter being movable vertically, said rider rod being rotatable on its axis and having affixed thereto a pinion, and the lifter having a rack engaging with said pinion.

18. A weighing scale according to claim 17, wherein the pinion and the rack are mounted in a slide-block carried by the rider rod, said slide-block being mounted for resilient engagement with the walls of a fixed housing.

References Cited in the file of this patent

UNITED STATES PATENTS

| Number | Name | Date |
|---|---|---|
| 768,829 | Thompson | Aug. 30, 1904 |
| 1,203,686 | Becker | Nov. 7, 1916 |
| 1,655,118 | Voland | Jan. 3, 1928 |
| 1,900,641 | Gattoni | Mar. 7, 1933 |
| 1,937,223 | Gattoni | Nov. 28, 1933 |
| 1,964,349 | Gattoni | June 26, 1934 |
| 1,997,636 | Gattoni | Apr. 16, 1935 |
| 2,081,252 | Seederer | May 25, 1937 |
| 2,102,938 | Becker | Dec. 21, 1937 |
| 2,111,842 | Dahlberg | Mar. 22, 1938 |
| 2,222,658 | Gattoni | Nov. 26, 1940 |
| 2,230,491 | Heusser | Feb. 4, 1941 |
| 2,295,440 | Wassberg | Sept. 8, 1942 |
| 2,373,056 | Seederer | Apr. 3, 1945 |
| 2,581,807 | Mettler | Jan. 8, 1952 |